US006917437B1

United States Patent
Myers et al.

(10) Patent No.: US 6,917,437 B1
(45) Date of Patent: Jul. 12, 2005

(54) RESOURCE MANAGEMENT FOR A PRINTING SYSTEM VIA JOB TICKET

(75) Inventors: Thomas A. Myers, Rochester, NY (US); Jonathan A. Dorsey, Rochester, NY (US); Richard M. Hraber, Bloomfield, NY (US); Stephen F. Skrainar, Penfield, NY (US); David S. Matthews, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/342,949

(22) Filed: Jun. 29, 1999

(51) Int. Cl.[7] .......................... G06K 15/02; G06F 3/12; G06F 13/00
(52) U.S. Cl. ...................... 358/1.15; 358/1.14; 358/1.13
(58) Field of Search ................................ 358/1.1, 1.15, 358/1.6, 1.13; 345/418; 399/47–48, 34, 51

(56) References Cited

U.S. PATENT DOCUMENTS

| | | | |
|---|---|---|---|
| 5,081,595 A | 1/1992 | Moreno et al. ............. 395/111 |
| 5,383,129 A | 1/1995 | Farrell .................... 364/464.01 |
| 5,835,820 A | 11/1998 | Martin et al. ................. 399/85 |
| 6,219,151 B1 * | 4/2001 | Manglapus et al. ......... 358/1.15 |
| 6,337,745 B1 * | 1/2002 | Aiello, Jr. et al. ......... 358/1.15 |
| 6,344,859 B1 * | 2/2002 | Alimpich et al. ............ 345/762 |
| 6,614,546 B1 * | 9/2003 | Kurozasa ................... 358/1.15 |
| 6,678,068 B1 * | 1/2004 | Richter et al. ............. 358/1.15 |

FOREIGN PATENT DOCUMENTS

WO    WO 94/11804    5/1994

OTHER PUBLICATIONS

U.S. Appl. No. 09/318,953, filed on May 26, 1999, entitled: Toner Age Calculation in Print Engine Diagnostic.

* cited by examiner

Primary Examiner—Douglas Tran
(74) Attorney, Agent, or Firm—Paul F. Doebler; Joseph M. Young

(57) ABSTRACT

The present invention relates to a printing system, and more particularly to a resource management using job tickets displayed on a user interface for controlling a printing system to generate documents received from one or more input units including a computer network, scanner, modem, etc. Since the operator or user wishes to offer a wide variety of printing options to customers and complete customer orders as quickly as possible, minimizing the interruption of print jobs is a very important priority. By replenishing supplies such as stock and toner in a timely fashion, the utilization of the printing systems can be maximized. In order for the operator to more efficiently utilize the printing system to perform a large number of print jobs with as few interruptions as possible, the present invention provides a user friendly navigational tool, which can provide the operator with information regarding the amount of printing supplies currently available in the printing system.

26 Claims, 14 Drawing Sheets

RESOURCE MANAGEMENT FOR A PRINTING SYSTEM VIA JOB TICKET

Attention is directed to applications U.S. patent application Ser. No. 09/342,713, filed Jun. 29, 1999, entitled, "USER INTERFACE FOR NAVIGATION AND CONTROL OF A PRINTING SYSTEM" and U.S. patent application Ser. No. 09/342,373, filed Jun. 29, 1999, now U.S. Pat. No. 6,504,556, issued Jan. 7, 2003, entitled OPERATION NOTATION TOOL TIP." The disclosures of these applications are hereby incorporated by reference in their entirety.

FIELD OF THE INVENTION

The present invention relates to a printing system, and more particularly to a resource management using job tickets displayed on a user interface for controlling a printing system to generate documents received from one or more input units including a computer network, scanner, modem, etc.

BACKGROUND OF THE INVENTION

Present and future high capacity printing systems are intended to provide an operator or user with as many job programming options and selections as reasonably possible. For example, at least four developer housings containing four different types of toner are utilized to provide color copying. Further, operators wish to choose from a very large variety of stock. Stock is the print media or support material on which prints are made. The number of print media choices is very large considering the great number of different sheet sizes, colors, and types that are used by customers today. The number is even larger due to the printing needs of different foreign countries.

Since the operator or user wishes to offer a wide variety of printing options to customers and complete customer orders as quickly as possible, minimizing the interruption of print jobs is a very important priority. By replenishing supplies such as stock and toner in a timely fashion, the utilization of high capacity printing systems can be maximized.

A large amount of information concerning the status of the current print job and the requirements of requested print jobs, which have not yet been performed, is required to maximize the utilization of the printing system. In order for the operator to more efficiently utilize the printing system to perform a large number of print jobs with as few interruptions as possible, there is a need for user friendly tools, which can provide the operator with information to manage and supply resources including printing supplies to the printing system in a timely manner.

SUMMARY OF THE INVENTION

A graphical user interface for providing job tickets and print job information on a display screen for a printing system, comprising: a depiction of a pathway access window including a print queue icon; a depiction of a printer status window including a printer icon; a display unit displaying a job ticket for each print job by selecting the print queue icon, each job ticket is associated with a job ticket icon indicating whether there are sufficient resources to complete the print job associated with the job ticket; and the display unit displaying print job information associated with each job ticket by selecting one of the job ticket icons. The print job information comprises at least one of the following types of information required stock information, required finishing information, and required resources information.

The pathway access window further comprises a print engine icon and the display unit displays print engine information by selecting the print engine icon. The print engine information includes toner levels in the printing system and the display unit displays an insufficient resources icon when there is insufficient toner to complete one of the print jobs.

The printer icon includes a depiction of the print engine and the display unit displays print engine information by selecting the depiction of the print engine. The print engine information includes toner levels in the printing system and the display unit displays an insufficient resources icon when there is insufficient toner to complete one of the print jobs.

The printer status window further comprises a multiuse job progress indicator, including total time, elapsed time and time remaining for a current print job.

A printing system for printing image data received from a computer network, scanner or other image data generating device on a support material, comprising a supply unit having a plurality of feeders, wherein each feeder has at least one tray for storing support material; a controller including: a system controller processing the received image data, and a user interface comprising: a print queue icon, a plurality of job tickets, and print job information displayed on the display screen by selecting one of the job tickets; a print engine including: a charging unit charging a surface of a photoconductive belt, a first exposure unit exposing a photoconductive belt to create an electrostatic latent image based on the received image data at the direction of the system controller, a first developed unit having first color charged toner particles, which are attracted to the electrostatic latent image, a second exposure unit exposing the photoconductive belt based on the received image data at the direction of the system controller, a second developer unit having second color charged toner particles, which are attracted to the electrostatic latent image, a third exposure unit exposing the photoconductive belt based on the received image data at the direction of the system controller, a third developer unit having third color charged toner particles, which are attracted to the electrostatic latent image, a fourth exposure unit exposing the photoconductive belt based on the received image data at the direction of the system controller, a fourth developer unit having fourth color charged toner particles, which are attracted to the electrostatic latent image, a transfer unit receiving support material and transferring the toner from the photoreceptor belt to the support material, a fuser assembly receiving the support material from the transfer unit and permanently affixing the toner to the sheet of support material, and a cleaning unit cleaning the photoreceptor belt; and a finishing unit, coupled to the print engine, the finishing unit comprising at least one of a stacker, binder, stapler and inserter.

In one embodiment, the fist color charged toner particles are magenta, the second charged toner particles are yellow, the third charged toner particles are cyan and the fourth charged toner particles are black.

The printer job information includes required stock information, required finishing information and required resources information. The user interface further comprises a print engine icon actuated to display unit engine information. The print engine information includes current toner levels, and the amount of toner required to complete print jobs based on the requirements in the print job tickets.

A printing system for printing image data received from a computer network, scanner or other image data generating device on a support material comprising; a supply unit having a plurality of feeders, wherein each feeder has at least one tray for storing support material; a controller including: a system controller processing the received image data, and a user interface comprising: a print queue icon, a plurality of job tickets, and print job information displayed on the display screen by selecting one of the job tickets; a print engine including: a charging unit charging a surface of a photoconductive belt, at least one exposure unit exposing a photoconductive belt to create an electrostatic latent image based on the received image data at the direction of the system controller, at least one developer unit having charged toner particles, which are attracted to the electrostatic latent image, a transfer unit receiving support material and transferring the toner from the photoreceptor belt to the support material, a fuser assembly receiving the support material from the transfer unit and permanently affixing the toner to the sheet of support material, and a cleaning unit cleaning the photoreceptor belt; and a finishing unit, coupled to the print engine, the finishing unit comprising at least one of a stacker, binder, stapler and inserter.

In one embodiment, the fist color charged toner particles are magenta, the second charged toner particles are yellow, the third charged toner particles are cyan and the fourth charged toner particles are black.

The print job information includes required stock information, required finishing information and required resources information. The user interface further comprises a print engine icon actuated to display print engine information. The print engine information includes current toner levels, and the amount of toner required to complete print jobs based on the requirements in the print job tickets.

A method for managing resources for print jobs, comprising: displaying print job tickets in print queue; identifying print job information necessary to complete print jobs based on contents of print job tickets; prompting modules for resource status information; receiving resource status information from modules; comparing resource status information to print job information for each job ticket; displaying first icon indicating that resources are available to complete print jobs for job tickets, where resources are sufficient; and displaying second icon indicating that resources are unavailable to complete print jobs for job tickets, where resources are insufficient. The print job information includes required stock information, required finishing information, and required resource information.

The method for managing resources further comprising displaying available and required stock information. The method for managing resources further comprising displaying available and required finishing information. The method for managing resources further comprising displaying available and required resource information. The method for managing resources for print jobs further comprising displaying available and required print engine information.

DETAILED DESCRIPTION OF THE PRESENT INVENTION

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined in the appended claims.

Figure 1:
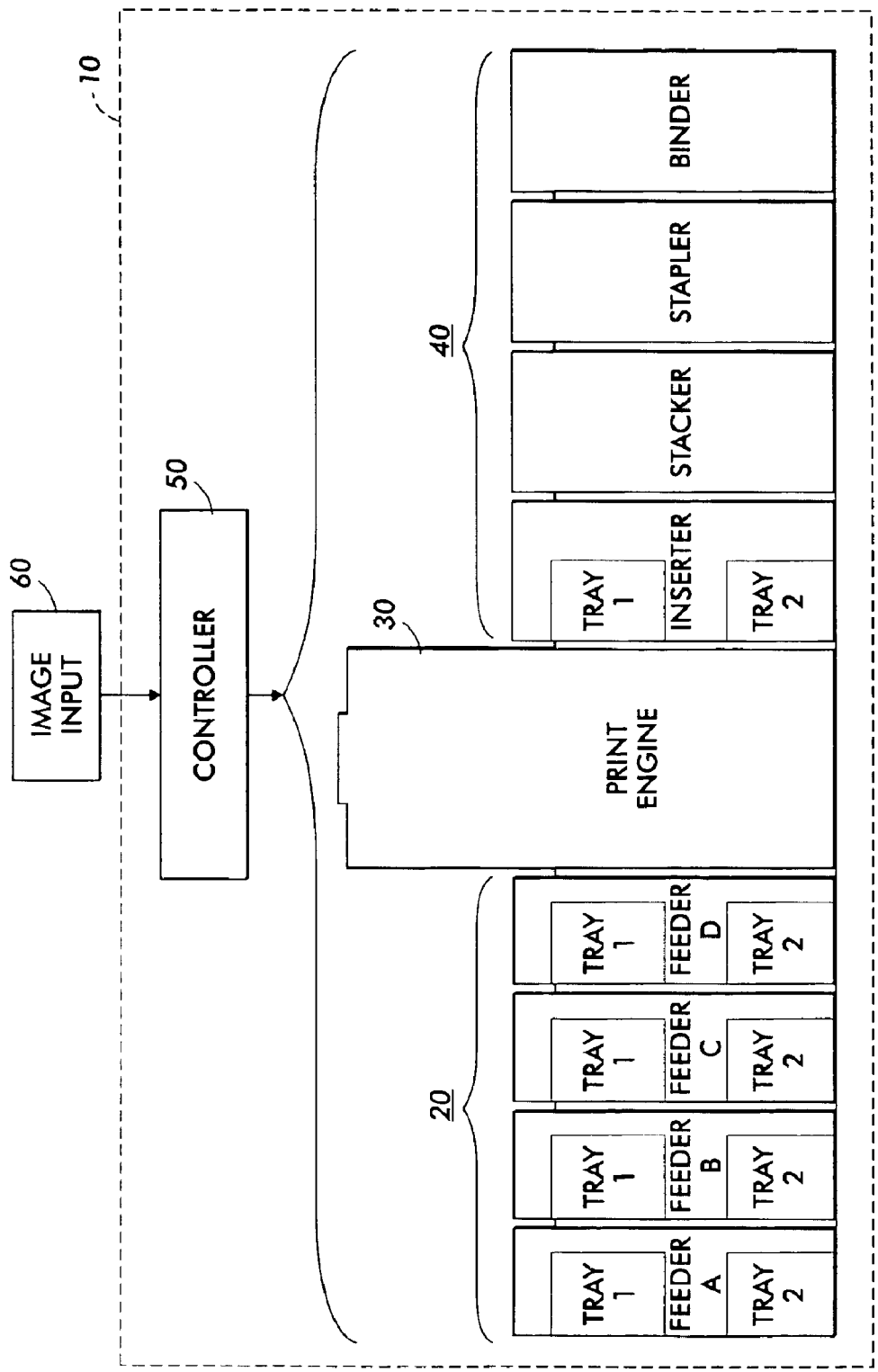
FIG. 1 shows a digital printing system into which the preferred embodiments may be incorporated.

FIG. 1 shows a digital printing system 10 of the type suitable for use with the preferred embodiment for processing print jobs. As shown, the digital printing system includes document feeders 20, a print engine 30, and finishers 40 and controller 50. The digital printing system 10 is coupled to an image input section 60.

Figure 2:
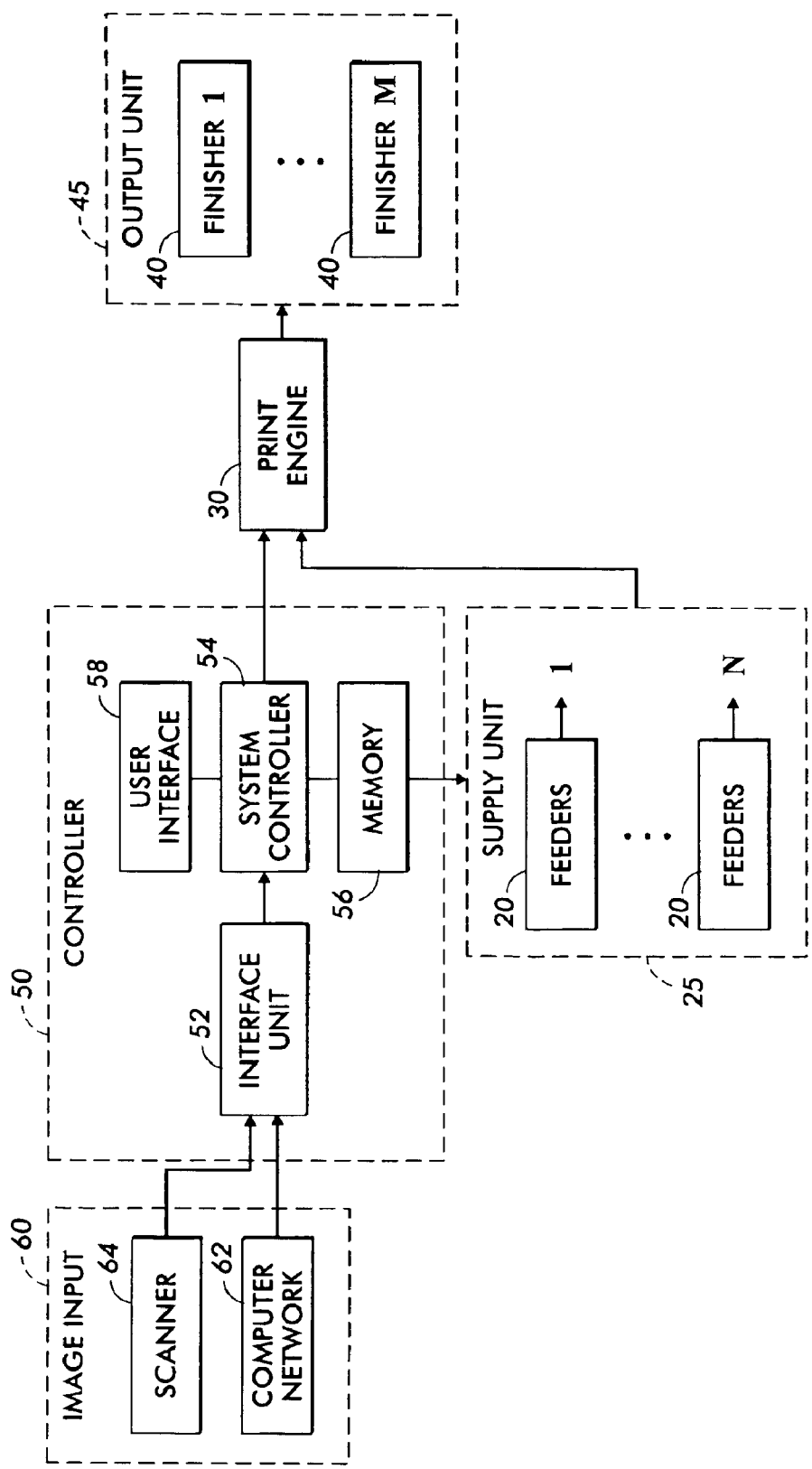
FIG. 2 is a general block diagram of the print system shown in FIG. 1.

As shown in FIG. 2, the image input section 60 transmits signals to the controller 50. In the example shown, image input section 60 has both remote and onsite image inputs, enabling the digital printing system 10 to provide network, scan and print services. In this example, the remote image input is a computer network 62, and the onsite image input is a scanner 64. However, the digital printing system 10 can be coupled to multiple networks or scanning units, remotely or onsite. Other systems can be envisioned such as stand alone digital printing system with on-site image input, controller and printer. While a specific digital printing system is shown and described, the present invention may be used with other types of printing systems such as analog printing systems.

The digital printing system 10 can receive image data, which can include pixels, in the form of digital image signals for processing from the computer network 62 by way of a suitable communication channel, such as a telephone line, computer cable, ISDN line, etc. Typically, computer networks 62 include clients who generate jobs, wherein each job includes the image data in the form of a plurality of electronic pages and a set of processing instructions. In turn, each job is converted into a representation written in a page description language (PDL) such as PostScript® containing the image data. Where the PDL of the incoming image data is different from the PDL used by the digital printing system, a suitable conversion unit converts the incoming PDL to the PDL used by the digital printing system. The suitable conversion unit may be located in an interface unit 52 in the controller 50. Other remote sources of image data such as a floppy disk, hard disk, storage medium, scanner, etc. may be envisioned.

For on-site image input, an operator may use the scanner 64 to scan documents, which provides digital image data including pixels to the interface unit 52. Whether digital image data is received from scanner 64 or computer network 62, the interface unit 52 processes the digital image data in the form required to carry out each programmed job. The interface unit 52 is preferably part of the digital printing system 10. However, the components in the computer network 62 or the scanner 64 may share the function of converting the digital image data into a form, which can be unutilized by the digital printing system 10.

As indicated previously, the digital printing system 10 includes feeders 20, print engine 30, finishers 40 and controller 50. Each feeder 20 preferably includes one or more trays 22, which forward different types of support material to the print engine 30. All of the feeders 20 in the digital printing system 10 are collectively referred to as a supply unit 25. All of the finishers 40 are collectively referred to as an output unit 45. The output unit 45 may comprise several types of finishers 40 such as inserters, stackers, staplers, binders, etc., which take the completed pages from the print engine and use them to provide a finished product.

Figure 3:
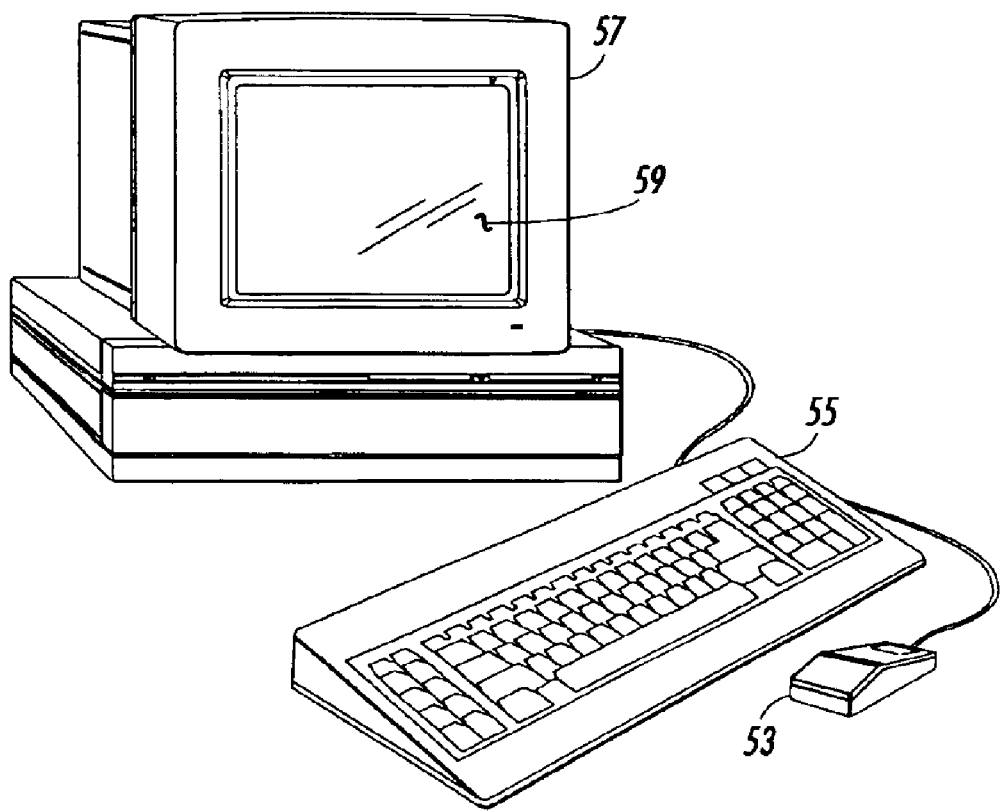
FIG. 3 is a general diagram of a few of the components of the user interface shown in FIG. 2.

The controller 50 controls and monitors the entire digital printing system 10 and interfaces with both on-site and remote input units in the image input section 60. The controller 50 includes the interface unit 52, a system control unit 54, a memory 56 and a user interface 58. The user interface 58 includes an area holding a graphic representation or picture of the feeders 20, print engine 30 and finishers of the digital printing system 10. The user interface 58 permits an operator to monitor the document feeders 20, print engine 30 and finishers 40 by navigating through a series of menus by clicking on a section of the graphical representation of the user interface 58 to reach controls or information related to that component of the digital printing system 10. Therefore, a user (also called an operator) can associate tasks done on the user interface 58 with their physical location on the digital printing system 10 and thereby enable faster and more intuitive navigation. The user interface 58 preferably includes a display screen 53, a keyboard 55 and a mouse 57 as shown in FIG. 3.

Figure 4:
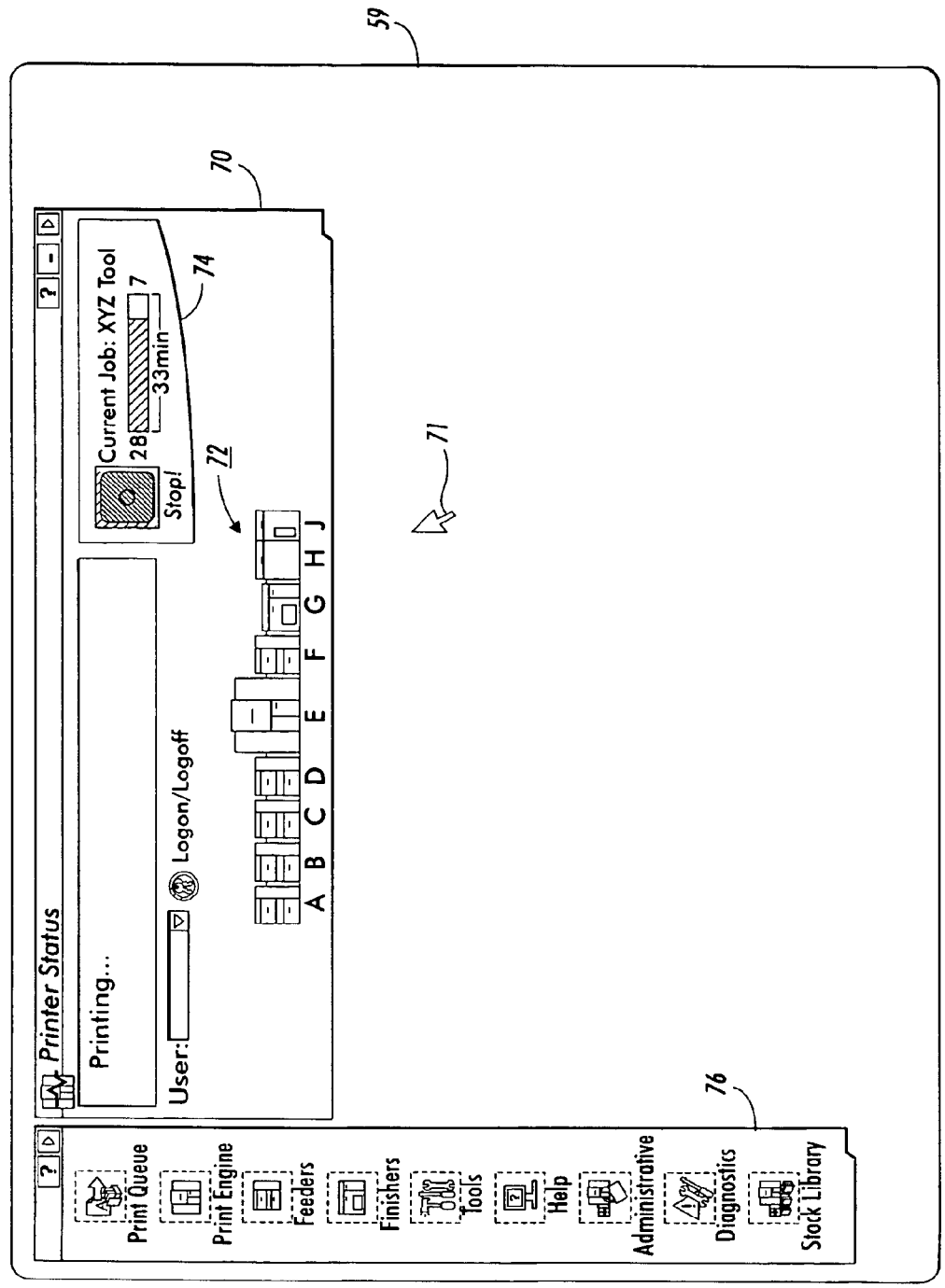
FIG. 4 is a view depicting an exemplary graphical representation of printer status window and pathway access window displayed on a user interface screen of the printing system shown in FIGS. 1 and 2.

FIG. 4 shows a graphical representation displayed on a display screen 59, which is used to reach controls or information related to components or supplies in the digital printing system 10, as taught by copending application Attorney Docket No. D/98736, U.S. patent application Ser. No. 09/342,713, filed Jun. 29, 1999, entitled, "USER INTERFACE FOR NAVIGATION AND CONTROL OF A PRINTING SYSTEM". FIG. 4 shows a printer status window 70 having a printer icon 72 including feeder icons A-D, print engine icon E, and finisher icons F-J. However, as indicated above, feeder icons and finisher icons can be added or removed so that the printer icon 72 is an accurate depiction of the printing system actually being used by the operator. The printer status window 70 also includes a job progress meter 74, which continuously informs the operator of the total time required to complete a print job (e.g. 33 minutes), the time that has elapsed since the print job began (e.g. 28 minutes) and the time remaining (7 minutes). This enables the operator to make choices as to whether to stop or suspend the current job in order to process a higher priority job.

FIG. 4 also shows a pathway access window 76, which also provides access to information and control of the digital printing system 10. For example, by highlighting and clicking on the diagnostic icon, customer service information, location of faults along the paper path, etc. are displayed on display screen 59. By highlighting and clicking on the tool icon, the operator can establish preferences such as the type of screen saver to be displayed on the display screen 59 and access power management tools to power down the digital printing system. The operator can also associate the addition or removal of modules such as a feeder 20 to the digital printing system 10. By highlighting and clicking on the administrative icon, this provides information on the users, job accounting and billing of jobs.

Figure 5:
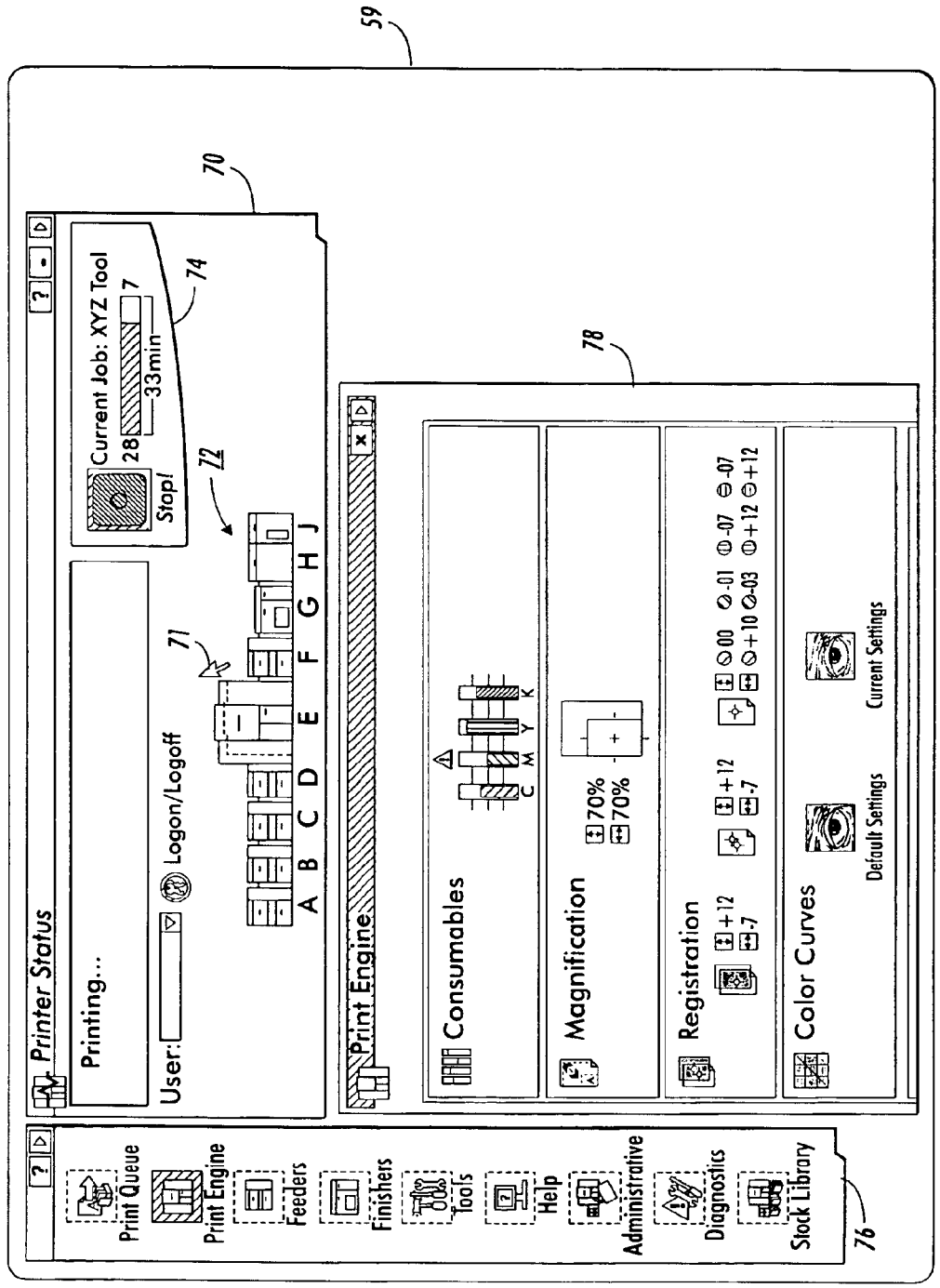
FIG. 5 is a view depicting an exemplary graphical representation of print engine settings and supplies displayed on a user interface screen of the printing system shown in FIGS. 1 and 2.
Figure 6:
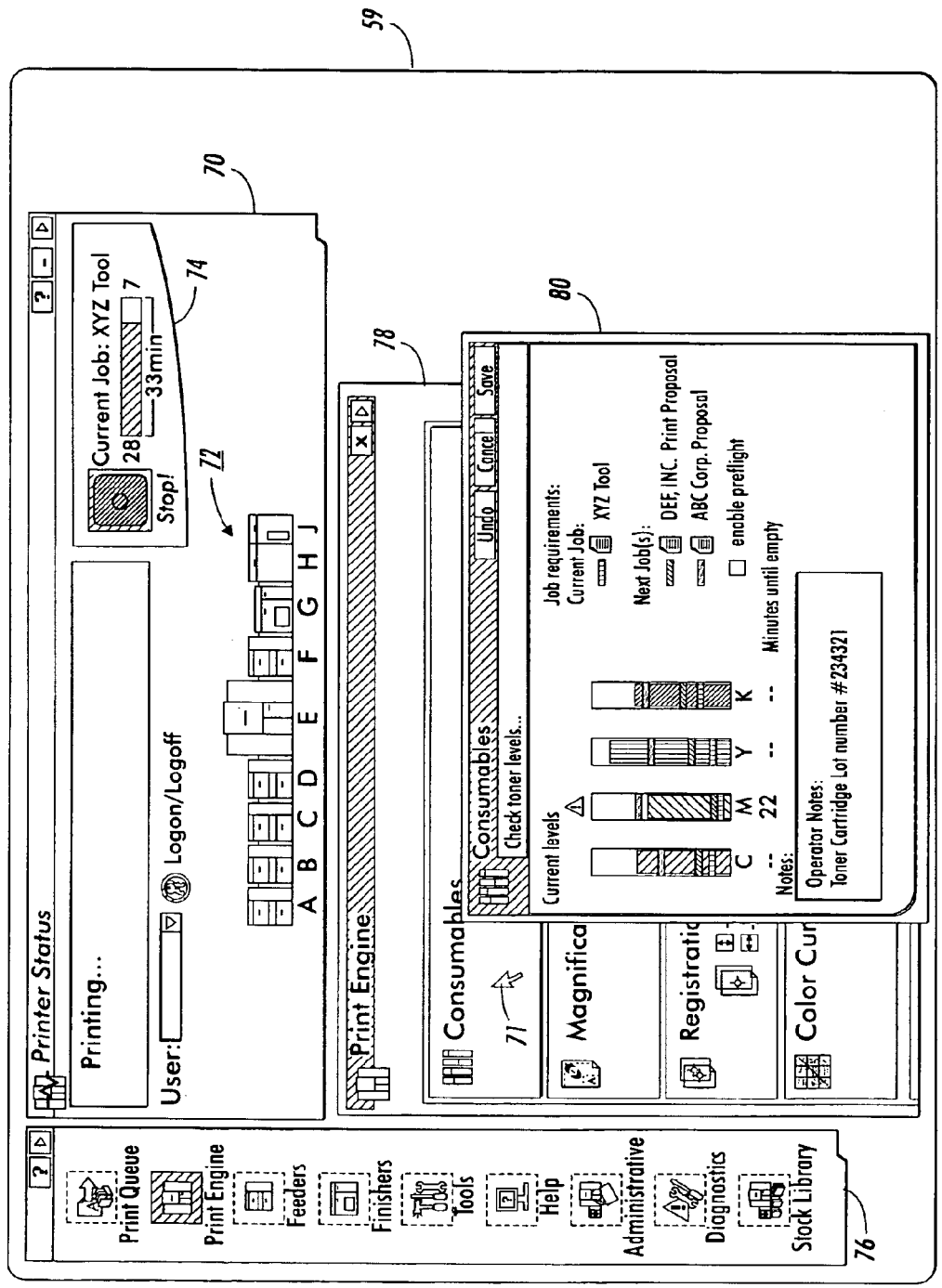
FIG. 6 is a view depicting an exemplary graphical representation of print engine consumables displayed on a user interface screen of the printing system shown in FIGS. 1 and 2.

By highlighting and then clicking on the print engine icon E of the printer status window 70 or by clicking on the print engine icon/button of the pathway access window 76, print engine information 78 is displayed as shown in FIG. 5. The print engine information is a summary of the current amount of consumables such as toner as well as the current magnification, registration and color curve settings. By clicking on consumables, more detailed consumable information 80 regarding the current toner levels in the print engine 30 are displayed as shown in FIG. 6. This window shows the user the current toner levels and the amount needed by each job in the print ready queue. The system alerts the user that it will run out of toner if all the jobs currently in the print queue combined require more toner than is currently available. Magenta is an example of this situation. An icon such as an exclamation point inside a triangle identifies the need for additional toner to complete the jobs in a print queue As can be seen from FIG. 6, the consumable information 80 does indicate that additional magenta toner must be added to complete "ABC Corp. Proposal . . ." print job. If additional magenta toner is not provided, then the digital printing system 10 skips the "ABC Corp. Proposal . . . ." print job, and executes the next print job in the queue.

Figure 7:
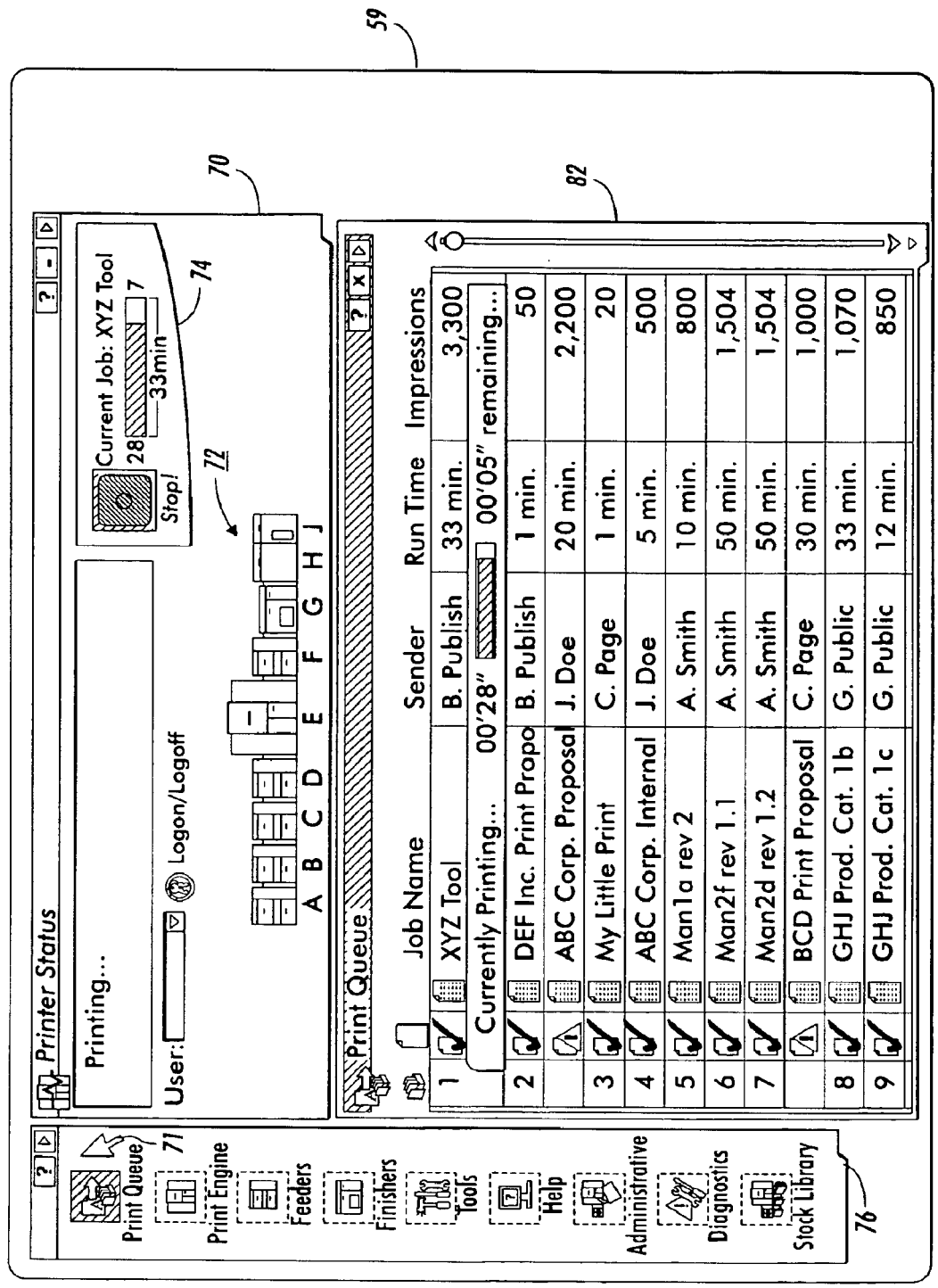
FIG. 7 is a view depicting an exemplary graphical representation of print queue displayed on a user interface screen of the printing system shown in FIGS. 1 and 2.

Referring to FIG. 7, by highlighting and clicking on the print queue icon, a depiction of the print queue 82, showing a list of active print jobs is displayed on display screen 59. A check mark icon displayed next to an active print job indicates that there are enough resources within the system to complete the print job. However, if an icon such as the exclamation point inside a triangle is displayed next to an active print job, then this notifies the operator that there are insufficient resources to complete the print job. By clicking on an active print job in the print queue list 59, a window, showing print job information from which required stock information 84, required finishing information 86 and required resources information 88 can be accessed, is displayed on display screen 59 (FIGS. 8 through 11).

Figure 8:
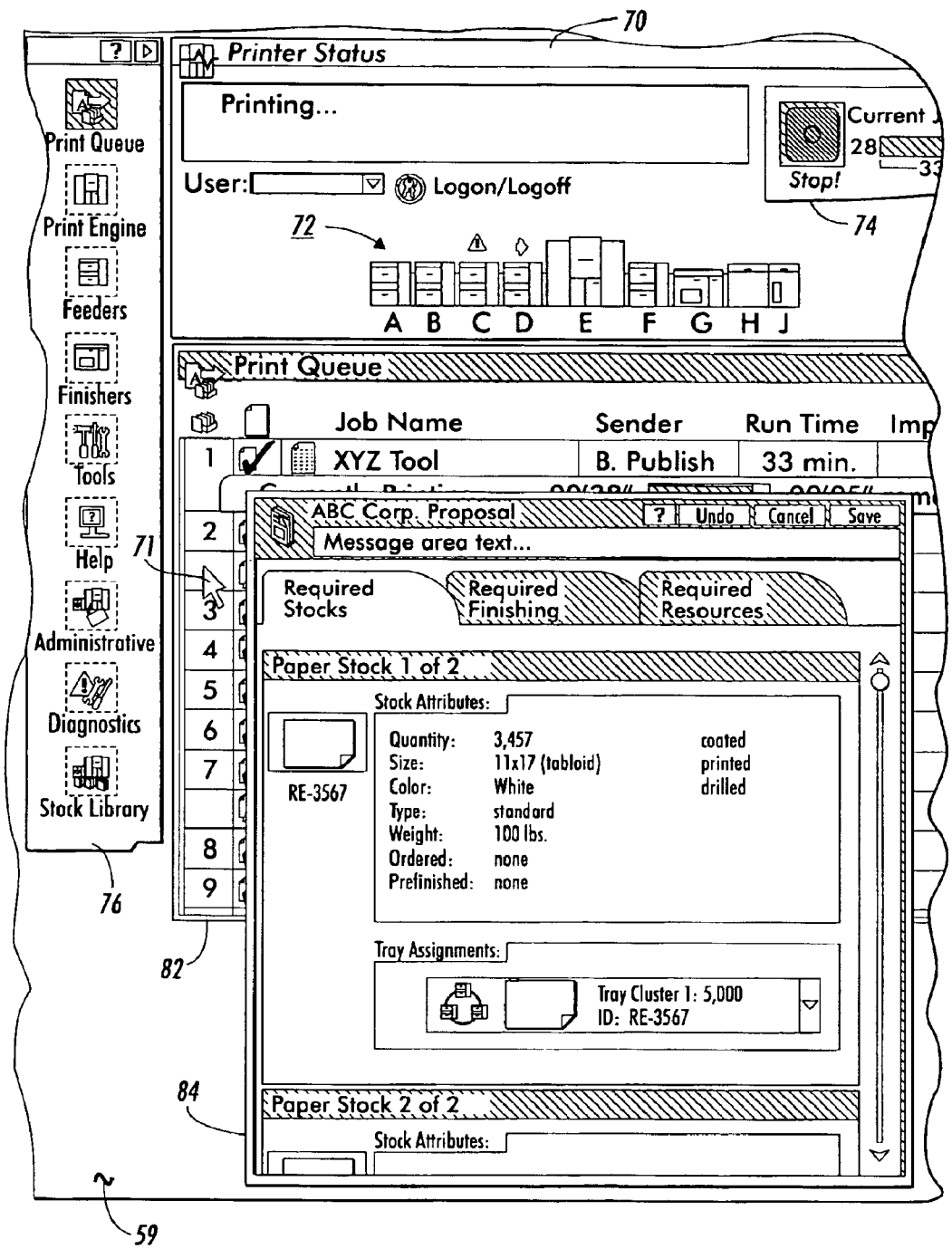
FIG. 8 is a view depicting an exemplary graphical representation of required stock information displayed on a user interface screen of the printing system shown in FIGS. 1 and 2.

FIG. 8 shows a list of stocks, and their associated attributes required for the job. Attributes can include: quantity, size, color, type, weight, ordered, and prefinished. Additionally, if a tray within the machine currently contains a required stock, it is also displayed below the stock. An operator can scroll through this list to see which of the required stocks is not programmed in the machine or requires replenishment. Both the available stock (current amount of stock in trays) and the required amount of stock are displayed.

Figure 9:
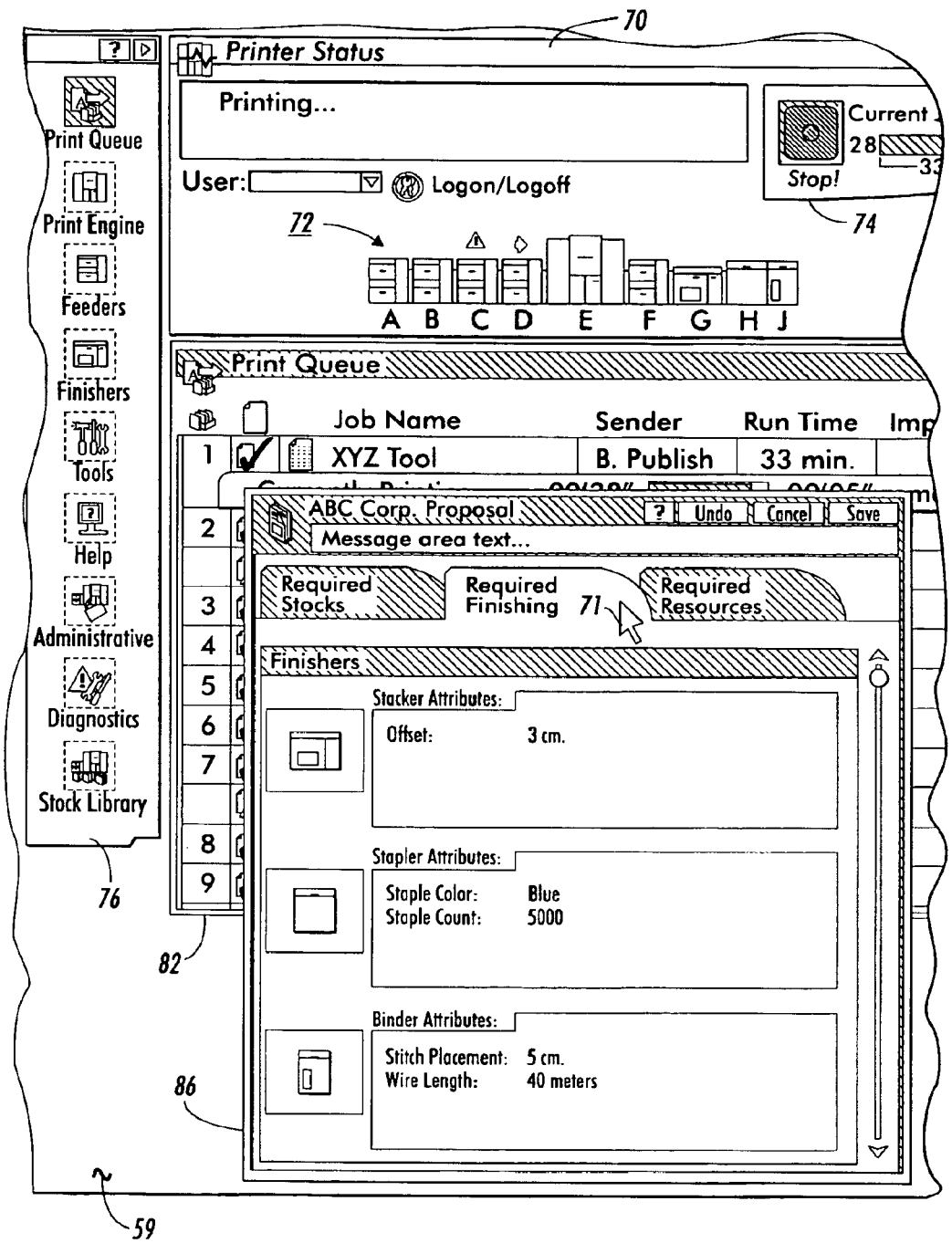
FIGS. 9–10 are views depicting an exemplary graphical representation of required finishing information displayed on a user interface screen of the printing system shown in FIGS. 1 and 2.
Figure 10:
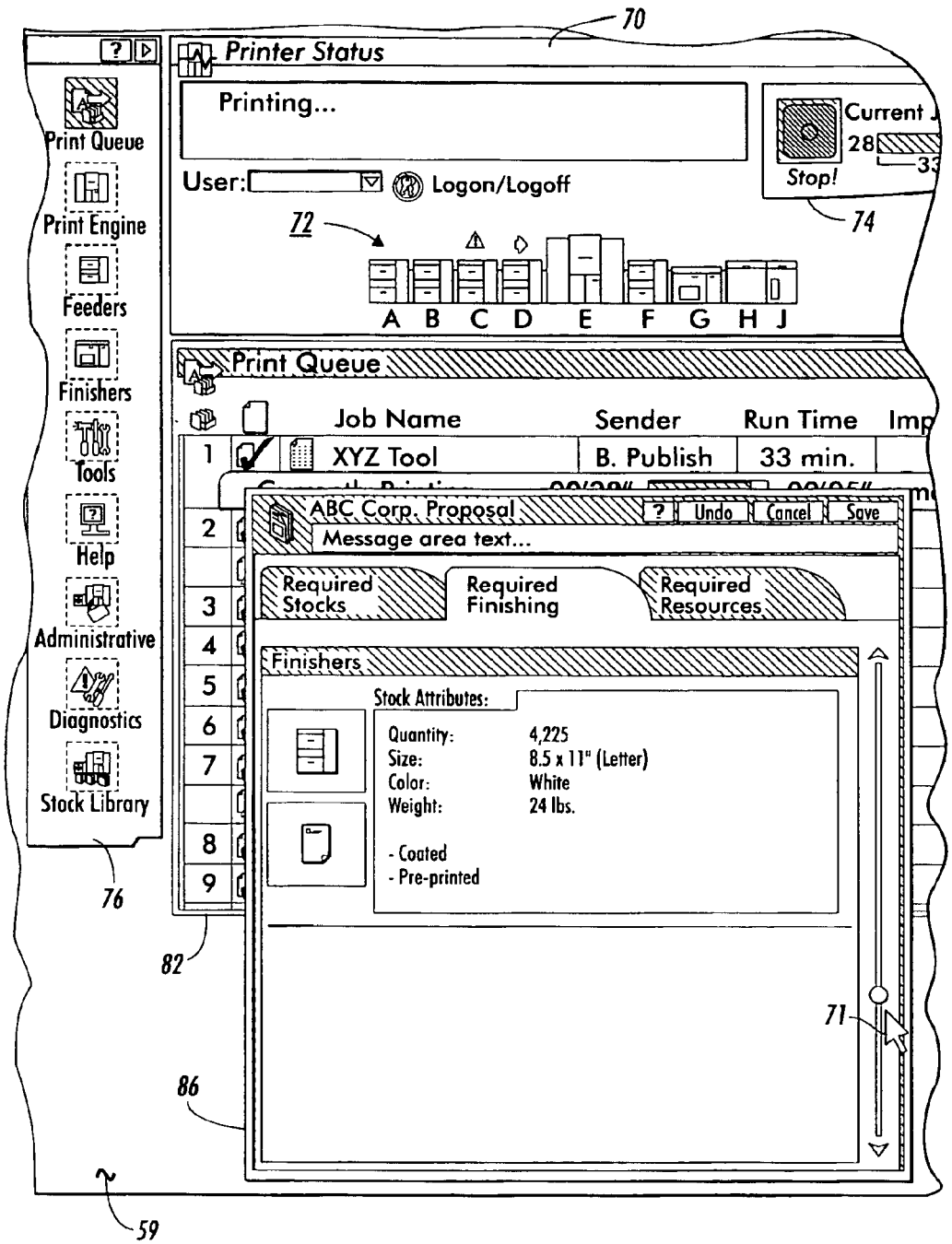

FIGS. 9–10 show the available (current) and required finishing materials for finishing units 20. This finishing information 86 depends upon the types of finishing units 20 in the digital printing system 10. For example, if an inserter is required for the print job, then the number of required sheets and other pertinent information would be shown. If a stapler was needed to complete the print job, the number of staples would be part of the information displayed. If a binder was needed to complete the print job, the type and required amount of binder wire would be part of the information displayed. If a stacker is required to complete the print job, the required stack offset settings would be displayed.

Figure 11:
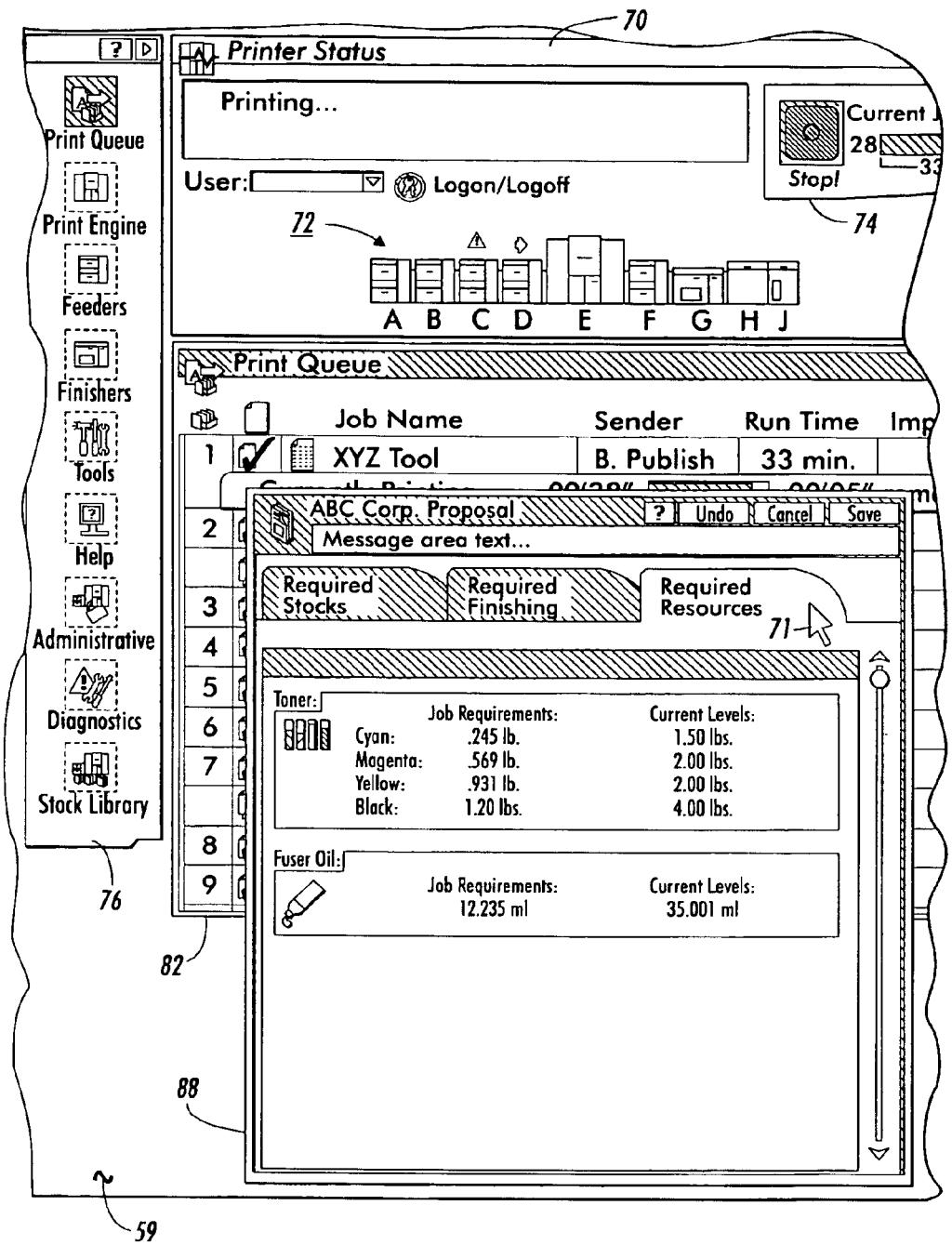
FIG. 11 is a view depicting exemplary graphical representation of required resources information displayed on a user interface screen of the printing system shown in FIGS. 1 and 2.

FIG. 11 shows the available (current) and required resources for the print engine 30 such as toner or fuser oil. The operator recognizes how much additional toner or fuser oil may be required by comparing the present levels within the system with the requirements of that particular job.

Figure 12:
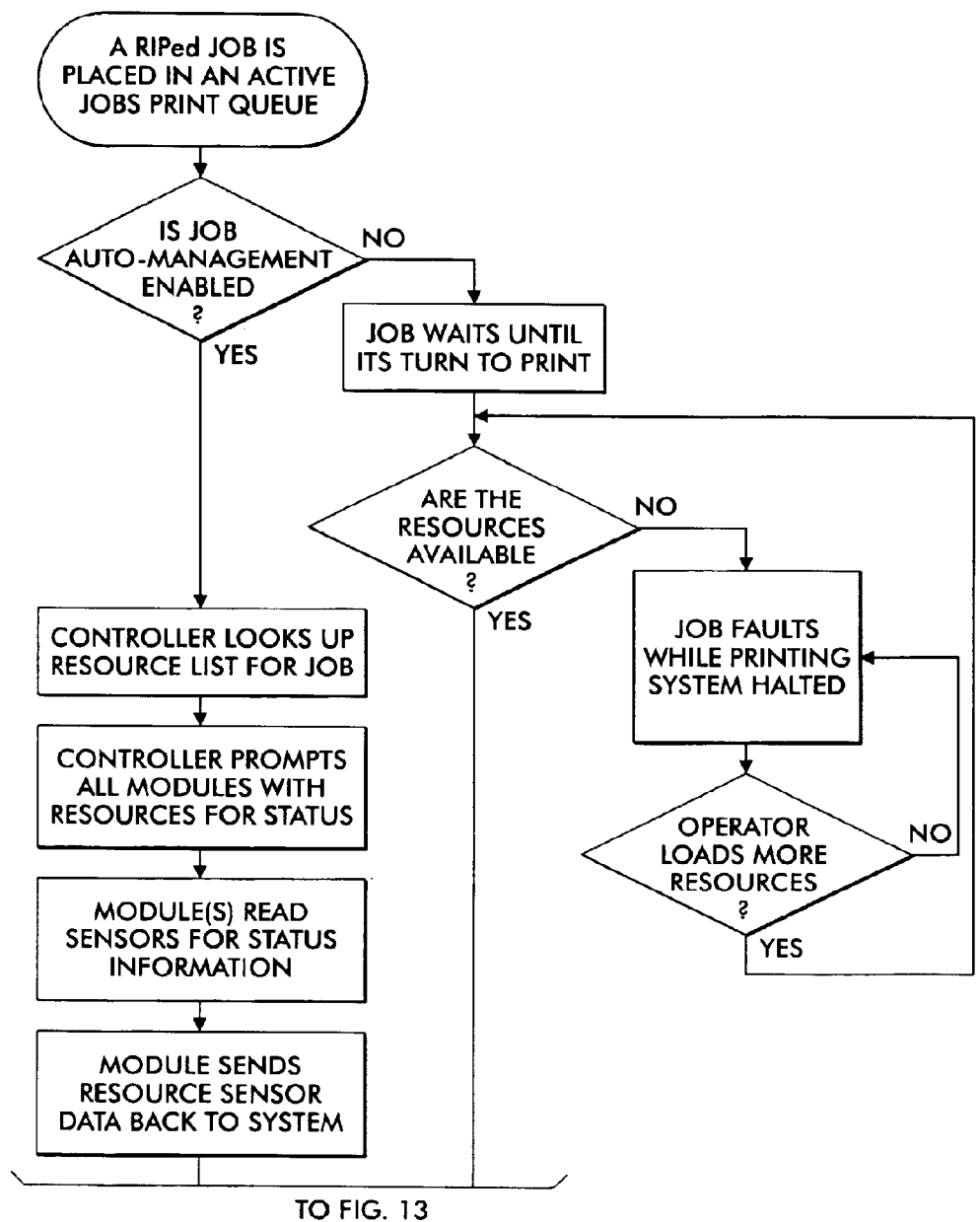
FIGS. 12–13 are flow charts showing the management resource process.
Figure 13:
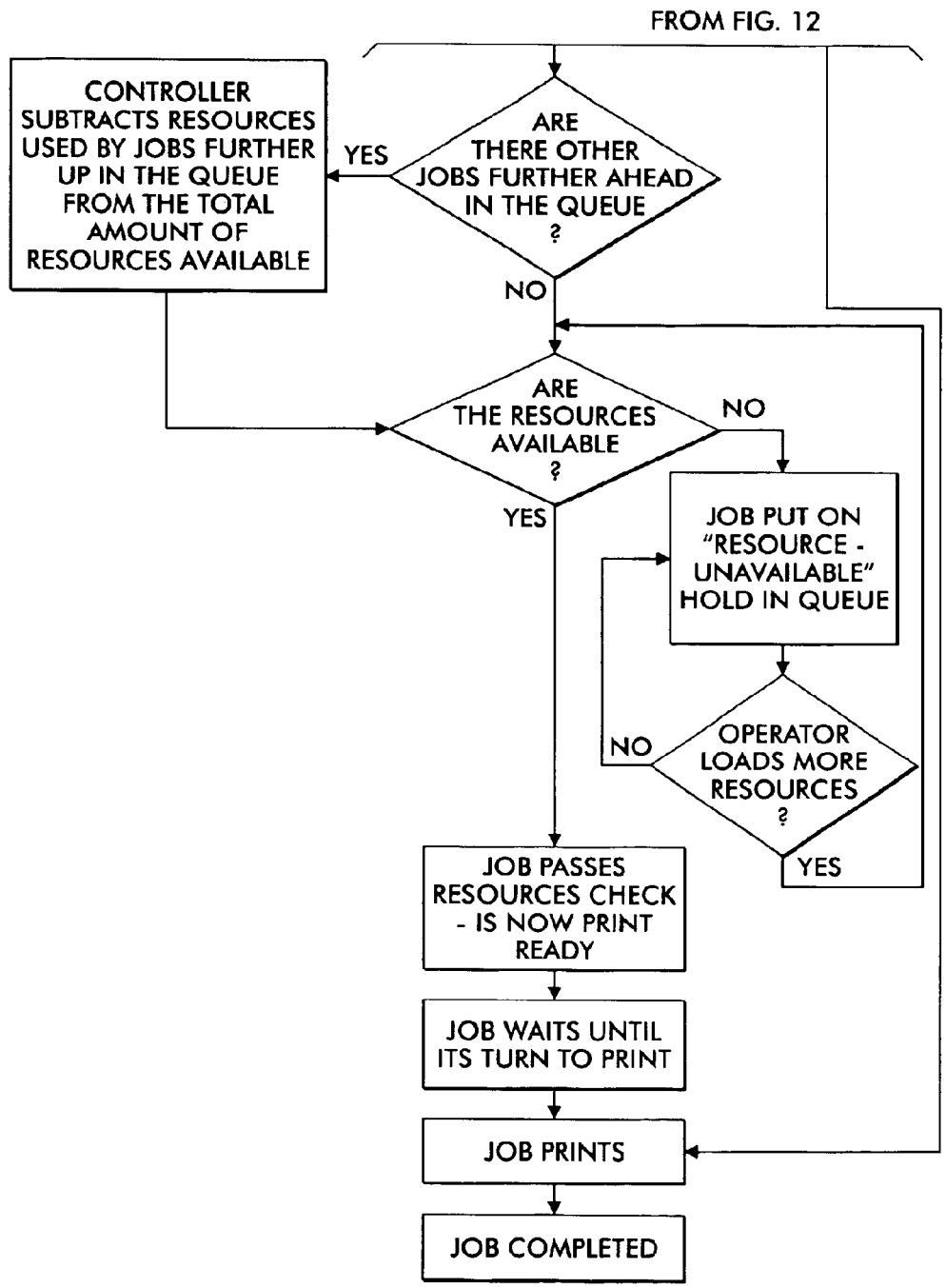

FIGS. 12 and 13 are flow charts showing the resource management process, which notifies the operator that there is insufficient information to complete a particular print job. Each RiPed job is placed in a print queue A RIPed job is a job that has been Raster Image Processed into a print ready format. However, any method of placing image data in a print ready format is acceptable. In small printing systems, where there may only be one feeder 20 having one or two trays, there may not be enough space to store different types of support material to complete many large jobs requested by clients. Therefore, the operator must supply additional support material or different support material several times to complete just one print job. In these cases, the job auto-management is disabled because continuous operation of the printer to complete a job is not possible. Instead, the controller 50 will check whether the resources are available to continue the print job. If the resources are available, the digital printing system 10 prints the job. However, if the controller 50 determines that the resources are no longer available, the controller 50 by way of the user interface 58 notifies the operator that there is a job fault and that additional support material is needed to complete the print job. Once the additional support material is provided, then the digital printing system 10 continues to print the job. However, the need for additional support material is just one example of the types of resources being detected. The controller 50 is also determining whether all of the other resources required to finish a print job, such as toner, are available. If any one of the resources is unavailable, the controller 50 notifies the operator by way of user interface 58.

In large printing systems where there are many feeders 20 and finishing units 40 to complete many large print jobs, the auto-management is enabled. The controller 50 examines each job ticket in the print queue to determine the resources required to complete each job. The controller 50 prompts all modules (feeders 20, print engine 30 and finishers 40) for status information, and the modules sends sensor information (sensor data) concerning the resources used in the module back to the controller 50. For each print job, the controller 50 subtracts the resources used by other print jobs having a higher priority in the print queue from the total amount of resources available. If the resources are available, then the controller 50 by way of the user interface 58 notifies the operator on the display screen 59 that the resources to print the job are available. For example, in FIG. 7, a check mark indicates that the resources are available to print the job. However, any icon may be used.

If the controller 50 determines that the resources necessary to complete a print job are unavailable, then the job is put on hold due to resource unavailability. The controller 50 by way of the user interface 58 notifies the operator on the display screen 59 that the resources to print the job are unavailable. The system would then skip to the next job. For example, in FIG. 7, an exclamation point inside a triangle indicates that the resources are available to print the job. However, any icon may be used. By highlighting and clicking on the job ticket window as shown in FIGS. 7–11, the operator can determine which resources are need to be added so that the print job can be completed. If the resource needed is additional toner, then this can be seen by accessing the print engine information as shown in FIG. 6. Once the operator loads more resources so that the print job can be completed, an icon such as the check mark will then replace the insufficient resources icon (e.g., exclamation point inside a triangle) on the dipole screen 59 to show the operator that the print job can now be completed. Then, the print job waits for its turn in the queue to print and thereafter completed.

Figure 14:
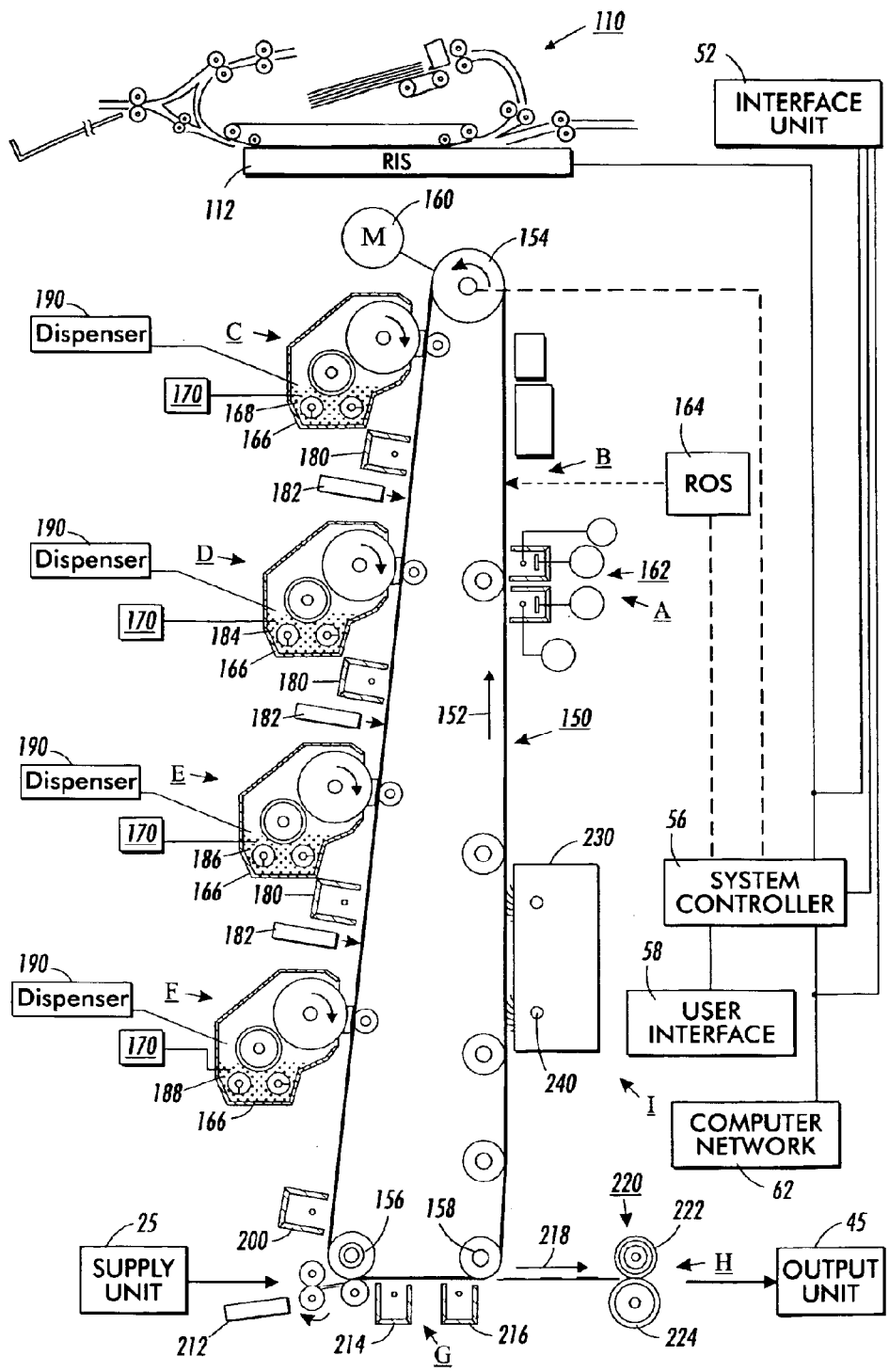
FIG. 14 is a partial schematic elevational view of an example of a printing system employing the user interface of the present invention.

FIG. 14 is a partial schematic view of a digital printing system, such as the digital imaging system of U.S. application Ser. No. 09/318,953, utilizing the navigation and control user interface of the present invention. U.S. application Ser. No. 09/318,953 is incorporated by reference. The imaging system is used to produce color output in a single pass of a photoreceptor belt. It will be understood, however, that it is not intended to limit the invention to the embodiment disclosed. On the contrary, it is intended to cover all alternatives, modifications and equivalents as may be included within the spirit and scope of the invention as defined by the appended claims, including a multiple pass color process system, a single or multiple pass highlight color system and a black and white printing system. The present invention is applicable to a printing system having a print engine with any number of developer housings.

In one embodiment, an original document can be positioned in a document handler 110 on a raster-input scanner (RIS) indicated generally by reference numeral 112. However, as shown in FIG. 2, any scanner 64 can be utilized. The RIS 112 capture the entire original document and converts it to a series of raster scan lines or image signals. This information is transmitted to an electronic subsystem (ESS) or system controller 54 by way of interface unit 52. System controller 54 includes a pixel counter, and is connected to a user interface 58. Alternatively, image signals may be supplied by a computer network 62 by way of interface unit 52.

The print engine preferably uses a charge retentive surface in the form of an Active Matrix (AMAT) photoreceptor belt 150 supported for movement in the direction indicated by arrow 152, for advancing sequentially through the various xerographic process stations. The photoreceptor belt 150 is entrained about a drive roller 154, tension rollers 156 and fixed roller 158 and the drive roller 154 is operatively connected to a drive motor 160 for effecting movement of the photoreceptor belt 150 through the xerographic stations. A portion of photoreceptor belt 150 passes through charging station A where a corona generating device, indicated generally by the reference numeral 162, charges the photoconductive surface of photoreceptor belt 150 to a relatively high, substantially uniform, preferably negative potential.

Next, the charged portion of photoconductive surface is advanced through an imaging/exposure station B. At imaging/exposure station B, the system controller 54 receives the image signals from raster input scanner 66 by way of the interface unit 52. The image signals represent the desired output image. The system controller 54 processes these signals to convert them to the various color separations of the image which is transmitted to a laser based output scanning device, which causes the charge retentive surface to be discharged in accordance with the output from the scanning device. Preferably the laser based scanning device is a laser Raster Output Scanner (ROS) 164. Alternatively, the ROS 164 could be replaced by other xerographic exposure devices such as LED arrays. A computer network 62 may also transmit image signals to the system controller 54 by way of the interface unit 52.

The photoreceptor belt 150, which is initially charged to a voltage $V_0$, undergoes dark decay to a level equal to about −500 volts. When exposed at the exposure station B, it is discharged to a level equal to about −50 volts. Thus after exposure, the photoreceptor belt 150 contains a monopolar voltage profile of high and lower voltages, the former corresponding to charged areas and the latter corresponding to discharged or background areas.

At a first development station C, developer structure, indicated generally by the reference numeral 166 utilizing a hybrid development system, the development roll, better known as the donor roll, is powered by two development fields (potentials across an air gap). The first field is the ac field which is used for toner cloud generation. The second field is the dc development field which is used to control the amount of developed toner mass on the photoreceptor belt 150. Preferably, the developer structure 166 contains magenta toner particles 168. The toner cloud causes charged magenta toner particles 168 to be attracted to the electrostatic latent image. Appropriate developer biasing is accomplished via a power supply. This type of system is a noncontact type in which only toner particles (magenta, for example) are attracted to the latent image and there is no mechanical contact between the photoreceptor belt 150 and a toner delivery device to disturb a previously developed, but unfixed, image. A toner concentration sensor 170 senses the toner concentration in the developer structure 166. A toner dispenser 190 adds new toner particles 168 to increase the toner concentration in the developer structure 166 at developer station C. The developed but unfixed image is then transported past a second charging device 180 where the photoreceptor belt 150 and previously developed toner image areas are recharged to a predetermined level.

A second exposure/imaging is performed by device 182. Device 182 preferably comprises a laser based output structure and is preferably utilized for selectively discharging the photoreceptor belt 150 on toned areas and/or bare areas, pursuant to the image to be developed with the second color toner. Device 182 may be a raster output scanner or LED window. At this point, the photoreceptor belt 150 contains toned and untoned areas at relatively high voltage levels and toned and untoned areas at relatively low voltage levels. These low voltage areas represent image areas which are developed using discharged area development (DAD). To this end, a negatively charged, developer material 184 comprising color toner, preferably yellow, is employed. The toner, which by way of example may be yellow, is contained in a developer structure 166 disposed at a second developer station D and is presented to the latent images on the photoreceptor belt 150 by way of a second developer system. A power supply (not shown) serves to electrically bias the developer structure 166 to a level effective to develop the discharged image areas with negatively charged yellow toner particles 184. Further, a toner concentration sensor 170 senses the toner concentration in the developer structure 166. A toner dispenser 190 adds new toner particles 184 to increase the concentration in the developer structure 166 at developer station D.

The above procedure is repeated for a third image for a third suitable color toner such as cyan 186 (station E) and for a fourth image and suitable color toner such as black 188 (station F). The exposure control scheme described below may be utilized for these subsequent imaging steps. In this manner a full color composite toner image is developed on the photoreceptor belt 150. In addition, a permeability sensor 200 measured developed mass per unit area. Although only one mass sensor 200 is shown in FIG. 1, there may be more than one mass sensor 200.

To the extent to which some toner charge is totally neutralized, or the polarity reversed, thereby causing the composite image developed on the photoreceptor belt 150 to consists of both positive and negative toner, a negative pre-transfer dicorotron member 214 is provided to condition all of the toner for effective transfer to a substrate using positive corona discharge.

Subsequent to image development a sheet of support material 212 from supply unit 25 is moved into contact with the toner images at transfer station G. The sheet of support material 212 is advanced to transfer station G by the supply unit 25. The sheet of support material 212 is then brought into contact with photoconductive surface of photoreceptor belt 150 in a timed sequence so that the toner powder image developed thereon contacts the advancing sheet of support material 212 at transfer station G.

Transfer station G includes a transfer dicorotron 214 which sprays positive ions onto the backside of support material 212. This attracts the negatively charged toner powder images from the photoreceptor belt 150 to sheet 212. A detack dicorotron 216 is provided for facilitating stripping of the sheets from the photoreceptor belt 150.

After transfer, the sheet of support material 212 continues to move, in the direction of arrow 218, onto a conveyor (not shown) which advances the sheet to fusing station H. Fusing station H includes a fuser assembly, indicated generally by the reference numeral 220, which permanently affixes the transferred powder image to sheet 212. Preferably, fuser assembly 220 comprises a heated fuser roller 222 and a backup or pressure roller 224. Sheet 212 passes between fuser roller 222 and backup roller 224 with the toner powder image contacting fuser roller 222. In this manner, the toner powder images are permanently affixed to sheet 212. After fusing, a chute, not shown, guides the advancing sheets 212 to the output unit 45, which includes one or more finishers 40 such as a catch tray, stacker, binder, stapler or other output device, for subsequent removal from the printing system by the operator.

After the sheet of support material 212 is separated from photoconductive surface of photoreceptor belt 150, the residual toner particles carrier by the non-image areas on the photoconductive surface are removed therefrom. These particles are removed at cleaning station I, preferably using a cleaning brush or plural brush structure contained in a housing 230. The cleaning brush 240 or brushes 240 are engaged after the composite toner image is transferred to a sheet. Once the photoreceptor belt 150 is cleaned the brushes 240 are retracted utilizing a device incorporating a clutch (not shown) so that the next imaging and development cycle can begin.

System controller 54 regulates the various printer functions. The system controller 54 is preferably a programmable controller, which controls printer functions hereinbefore described. The system controller 54 may provide a comparison count of the copy sheets, the number of documents being recirculated, the number of copy sheets selected by the operator, time delays, jam corrections, etc. The control of all of the exemplary systems heretofore described may be accomplished by conventional control switch inputs from the printing machine consoles selected by an operator. Conventional sheet path sensors or switches may be utilized to keep track of the position of the document and the copy sheets.

While the Figures show one example of a printing system incorporating the user interface navigation and control system of the present invention, it is understood that this process could be used in any printing system. Further, it also understood that a window can be actuated by an operator and displayed on the display screen 59 by pointing a cursor at an icon and clicking on the icon, pointing a cursor and double-clicking on the icon, and highlighting the icon and then clicking on the icon. However, actuating a window is not limited to the above three methods. It is understood that any method of opening a window can be utilized.

While the invention has been described in detail with reference to specific and preferred embodiments, it will be appreciated that various modifications and variations will be apparent to the artisan. All such modifications and embodiments as may occur to one skilled in the art are intended to be within the scope of the appended claims.

What is claimed is:

1. A graphical user interface for providing job tickets and print job information on a display screen for a printing system, comprising:
    a depiction of a pathway access window including a print queue icon;
    a depiction of a printer status window including a printer icon; and
    a depiction of a job ticket window displaying a job ticket for each print job, wherein the job ticket window is displayed when the print queue icon is selected, and wherein each job ticket is associated with a job ticket icon indicating whether there are sufficient resources to complete the print job associated with the job ticket.

2. The graphic user interface as in claim 1, wherein the pathway access window further comprises a print engine icon, and wherein a print engine information window showing print engine information is displayed when the print engine icon is selected.

3. The graphical user interface as in claim 2, wherein the print engine information includes toner levels in the printing system and wherein the print engine information window includes an insufficient resources icon when there is insufficient toner to complete one of the print jobs.

4. The graphical user interface as in claim 1, wherein the printer icon includes a depiction of the print engine.

5. The graphical user interface as in claim 4, wherein the print engine information includes toner levels in the printing system and wherein the print engine information window includes an insufficient resources icon when there is insufficient toner to complete one of the print jobs.

6. The graphical user interface as in claim 1, wherein the printer status window further comprises a multiuse job progress indicator, including total time, elapsed time and time remaining for a current print job.

7. The graphical user interface as in claim 1, further comprising a detailed job information window, which appears when one of the job ticket icons is selected, wherein the job information window includes job information associated with each job ticket not shown in the job ticket window.

8. The graphical user interface as in claim 7, wherein the print job information comprises required stock information.

9. The graphical user interface as in claim 7, wherein the print job information comprises required finishing information.

10. The graphical user interface as in claim 17, wherein the print job information comprises required resources information.

11. A printing system for printing image data received from a computer network, scanner or other image data generating device on a support material, comprising:
    a supply unit having a plurality of feeders, wherein each feeder has at least one tray for storing support material;
    a controller including:
    a system controller processing the received image data, and
    a user interface comprising:
    a print queue icon,
    a plurality of job tickets, and
    print job information displayed on the display screen by selecting one of the job tickets;
    a print engine including:
    a charging unit charging a surface of a photoconductive belt,
    a first exposure unit exposing a photoconductive belt to create an electrostatic latent image based on the received image data at the direction of the system controller,
    a first developer unit having first color charged toner particles, which are attracted to the electrostatic latent image,
    a second exposure unit exposing the photoconductive belt based on the received image data at the direction of the system controller,
    a second developer unit having second color charged toner particles, which are attracted to the electrostatic latent image,
    a third exposure unit exposing the photoconductive belt based on the received image data at the direction of the system controller,
    a third developer unit having third color charged toner particles, which are attracted to the electrostatic latent image,
    a fourth exposure unit exposing the photoconductive belt based on the received image data at the direction of the system controller,
    a fourth developer unit having fourth color charged toner particles, which are attracted to the electrostatic latent image,
    a transfer unit receiving support material and transferring the toner from the photoreceptor belt to the support material,
    a fuser assembly receiving the support material from the transfer unit and permanently affixing the toner to the sheet of support material, and a cleaning unit cleaning the photoreceptor belt; and
    a finishing unit, coupled to the print engine, the finishing unit comprising at least one of a stacker, binder, stapler and inserter.

12. The printing system as in claim 11, wherein the first color charged toner particles are magenta, the second charged toner particles are yellow, the third charged toner particles are cyan and the fourth charged toner particles are black.

13. The printing system as in claim 11, wherein the print job information includes required stock information, required finishing information and required resources information.

14. The printing system as in claim 11, wherein the user interface further comprises a print engine icon arcuately to display print engine information.

15. The printing system as in claim 14, wherein the print engine information includes current toner levels, and the amount of toner required to complete print jobs based on the requirements in the print job tickets.

16. A printing system for printing image data received from a computer network, scanner or other image data generating device on a support material, comprising:
   a supply unit having a plurality of feeders, wherein each feeder has at least one tray for storing support material;
   a controller including:
   a system controller processing the received image data, and
   a user interface comprising:
   a print queue icon,
   a plurality of job tickets, and
   print job information displayed on the display screen by selecting one of the job tickets; a print engine including:
   a charging unit charging a surface of a photoconductive belt,
   at least one exposure unit exposing a photoconductive belt to create an electrostatic latent image based on the received image data at the direction of the system controller,
   at least one developer unit having charged toner particles, which are attracted to the electrostatic latent image,
   a transfer unit receiving support material and transferring the toner from the photoreceptor belt to the support material,
   a fuser assembly receiving the support material from the transfer unit and permanently affixing the toner to the sheet of support material, and
   a cleaning unit cleaning the photoreceptor belt; and
   a finishing unit, coupled to the print engine, the finishing unit comprising at least one of a stacker, binder, stapler and inserter.

17. The printing system as in claim 16, wherein the fist color charged toner particles are magenta, the second charged toner particles are yellow, the third charged toner particles are cyan and the fourth charged toner particles are black.

18. The printing system as in claim 16, wherein the print job information includes required stock information, required finishing information and required resources information.

19. The printing system as in claim 16, wherein the user interface further comprises a print engine icon actuated to display print engine information.

20. The printing system as in claim 19, wherein the print engine information includes current toner levels, and the amount of toner required to complete print jobs based on the requirements in the print job tickets.

21. A method for managing resources for print jobs, comprising:
   displaying one or more print job tickets in a print queue;
   identifying print job information necessary to complete print jobs based on contents of the print job tickets;
   prompting modules for resource status information;
   receiving resource status information from modules;
   comparing resource status information to print job information for each job ticket;
   displaying a first icon indicating that resources are available to complete print jobs for each job tickets, where resources are sufficient; and
   displaying a second icon indicating that resources are unavailable to complete print jobs for each job tickets, where resources are insufficient.

22. A method for managing resources for print jobs as in claim 21, wherein print job information includes required stock information, required finishing information, and required resource information.

23. A method for managing resources for print jobs as in claim 21, further comprising displaying available and required stock information.

24. A method for managing resources for print jobs as in claim 21, further comprising displaying available and required finishing information.

25. A method for managing resources for print jobs as in claim 21, further comprising displaying available and required resource information.

26. A method for managing resources for print jobs as in claim 21, further comprising displaying available and required print engine information.

* * * * *